Jan. 15, 1935. R. ZAVARELLA 1,988,066
BRAKE OPERATING MECHANISM
Filed Aug. 28, 1933
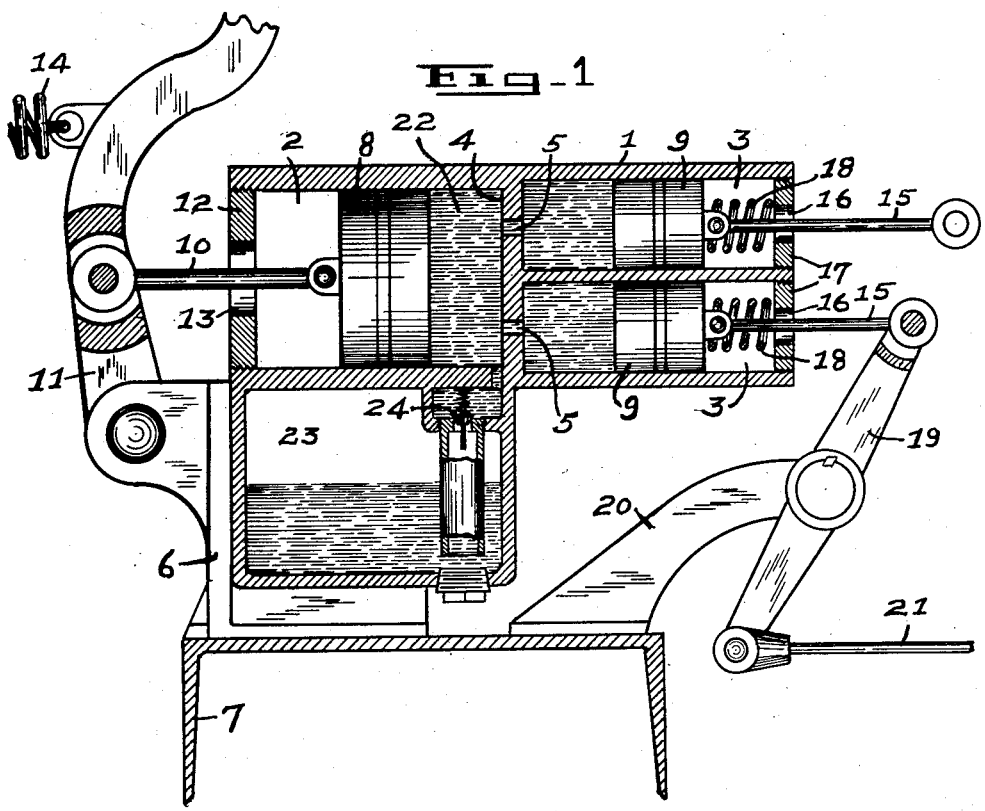
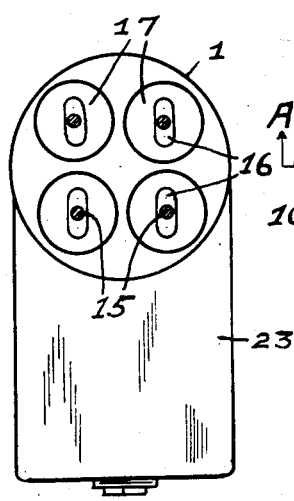
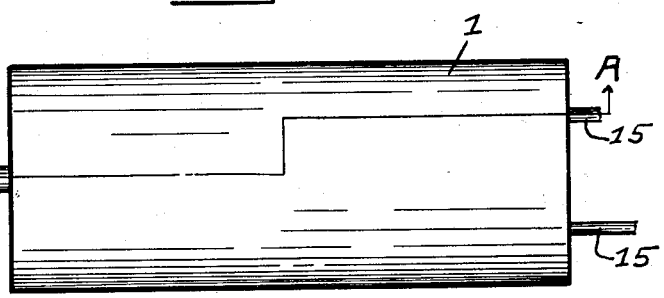
INVENTOR
Raphael Zavarella
By Jack R Dwyer
Attorney

UNITED STATES PATENT OFFICE 1,988,066

BRAKE OPERATING MECHANISM

Raphael Zavarella, Pittsburgh, Pa., assignor to John A. Rykaczewski, Braddock, Pa.

Application August 28, 1933, Serial No. 687,119

1 Claim. (Cl. 60—54.5)

This invention relates to a brake operating mechanism for motor vehicles, and important objects thereof are to provide a device of the character described, which combines and employs all of the desirable features of the usual hydraulically and mechanically operated brakes in a novel manner, which includes hydraulically operated elements embodied in an unitary integral structure, which assures uniform and equalized braking action, which is simple in its construction and arrangement, durable and efficient in its use, compact, and comparatively inexpensive to manufacture, install and maintain.

With the foregoing and other objects in view which will appear as the description proceeds, the invention consists of the novel construction, combination and arrangement of parts herein specifically described and illustrated in the accompanying drawing, but it is to be understood that the drawing is merely illustrative of an embodiment of the invention, and that changes in the form, proportions and details of construction may be resorted to that come within the scope of the claim hereunto appended.

In the drawing wherein like numerals of reference designate corresponding parts throughout the several views:

Figure 1 is a vertical sectional view of a brake operating mechanism constructed in accordance with the invention, and taken on line A—A, Figure 3.

Figure 2 is an end view of the device, and Figure 3 is a top plan view thereof.

Referring in detail to the drawing 1 denotes an integrally formed body portion provided with an operating cylinder 2 and four brake cylinders 3. The brake cylinders are arranged in grouped alignment with the operating cylinder and separated from the latter by a vertically disposed partition wall 4. The inner adjacent ends of the operating and brake cylinders communicate with each other through respective ports 5, which are formed in the partition wall 4.

The body portion 1 is rigidly fixed in position by a supporting bracket 6, which is secured to a frame member 7 of the motor vehicle chassis. It is evident, however, that the device may be attached to the motor vehicle in any other suitable manner required to best meet conditions found in practice.

The operating cylinder 2 and the brake cylinders 3 are disposed horizontally. A piston 8 is slidably mounted in the former and a plunger 9 is slidably mounted in each of the latter.

A piston rod 10 is pivotally connected with the piston 8 and projects from the outer end of the operating cylinder 2. The outer end of the piston rod is pivotally joined with a brake lever 11, which latter has its lower end pivotally attached to the supporting bracket 6. A closure plug 12 is threadedly engaged in the outer end of the operating cylinder and provided with a vertically extending oblong slot 13 for the passage of the piston rod and for permitting the requisite varied movement of the latter during the operation of the device. A spring 14, suitably joined with the vehicle chassis and with the brake lever 11, normally functions to return the latter to the inoperative position, whereby the piston 8 is drawn to its outer inoperative position within the operating cylinder 2.

A plunger rod 15 is pivotally connected to each of the plungers 9, and projects through an oblong compensating slot 16 formed in the closure plug 17, which is threadedly engaged in the outer end of respective brake cylinders 3. Springs 18 are carried on the plunger rods within the brake cylinders and normally function to force the plungers to their inner inoperative positions within said brake cylinders.

The outer end of each plunger rod 15 is pivotally connected with one end of a cross-arm 19, which is mounted, for oscillatory movement, on a support 20 suitably fixed to the vehicle chassis. The other end of the cross-arm is pivotally joined with a pull rod 21. The latter extends to and joins with the braking mechanism at a wheel of the vehicle in the usual manner of mechanically operated braking devices.

Operating liquid 22, of any suitable character, is carried in the operating and brake cylinders 2 and 3 between the adjacent inner ends of the piston 8 and the plungers 9. The inward movement of the piston in the operating cylinder will force the liquid through the partition ports 5 into the brake cylinders, whereby the plungers will be forced outwardly in the latter to actuate the cross-arms 19 and pull rods 21 to effect the braking operation. The retraction or outward movement of the piston will draw the liquid from the brake cylinders, thereby allowing the plungers to shift to their inner inoperative positions to release the braking action of the device.

The body portion 1 includes a liquid storage reservoir 23, which communicates with the operating cylinder 2. The storage reservoir is provided with a check valve element 24, which functions to permit the intake of additional operating liquid to the operating cylinder when required.

The feature of the present invention resides in the provision of an integrally formed operating mechanism, wherein the brake cylinders 3 are embodied in a unitary structure. Each of the brake cylinders with its plunger and rod, has its own, separate and individual connecting elements with the respective brake mechanism at each wheel of the motor vehicle. As the braking operation of one wheel is entirely independent of any of the other wheels, the braking operation is perfectly equalized, even if the wheel brakes are not uniformly adjusted, for the uniform pressure in each of the braking cylinders will shift the various plungers a greater or less distance and thereby equalize the braking action of the device.

The present invention provides a most efficient device of its kind, which is conveniently operable to give an equalized braking action regardless of the relative adjustment of the individual braking elements at the wheels of a motor vehicle.

What I claim is:

In a motor vehicle hydraulic brake operating mechanism of the character described, the combination of an integrally formed body portion provided with an operating cylinder and four brake cylinders, said brake cylinders being grouped and arranged in alignment with said operating cylinder, a partition wall separating and forming the inner ends of said operating and brake cylinders, said partition wall being provided with ports establishing communication between said operating cylinder and with respective brake cylinders, a piston mounted in said operating cylinder, a piston rod having a pivotal connection with said piston and with the brake lever of the motor vehicle, a closure plug provided with an oblong slot mounted in the outer end of each of said brake cylinders, a plunger mounted in each of said brake cylinders, a plunger rod pivotally joined with each of said plungers and projecting through said oblong slots in respective closure plugs and connected with the respective brakes of the motor vehicle, and a spiral spring mounted on each of the plunger rods and disposed within the said brake cylinders for normally engaging and forcing said plungers to the inoperative positions toward said partition wall.

RAPHAEL ZAVARELLA.